United States Patent [19]

Leger et al.

[11] Patent Number: 5,983,291
[45] Date of Patent: Nov. 9, 1999

[54] SYSTEM FOR STORING EACH OF STREAMS OF DATA BITS CORRESPONDING FROM A SEPARATOR THEREBY ALLOWING AN INPUT PORT ACCOMMODATING PLURALITY OF DATA FRAME SUB-FUNCTIONS CONCURRENTLY

[75] Inventors: Geary L. Leger, Fremont; Peter R. Carpenter, Watsonville; Tong Tang, San Jose, all of Calif.

[73] Assignee: Cirrus Logic, Inc., Fremont, Calif.

[21] Appl. No.: 08/717,173

[22] Filed: Sep. 24, 1996

[51] Int. Cl.[6] ...................................................... G06F 13/38
[52] U.S. Cl. .............................. 710/52; 710/30; 709/231; 709/236
[58] Field of Search ...................................... 395/565, 842, 395/872, 891, 200.49, 200.61, 200.66, 850; 370/464, 474, 476, 480, 413, 490; 712/224; 710/22, 30, 52, 71; 709/219, 231, 236

[56] References Cited

U.S. PATENT DOCUMENTS

| | | | |
|---|---|---|---|
| 3,411,145 | 11/1968 | Cragon et al. | 340/172.5 |
| 4,513,419 | 4/1985 | Small | 371/29 |
| 4,691,297 | 9/1987 | Wolff | 364/900 |
| 4,914,607 | 4/1990 | Takanashi et al. | 364/921 |
| 4,939,723 | 7/1990 | Harley, Jr. et al. | 370/84 |
| 5,134,702 | 7/1992 | Charych et al. | 395/500 |
| 5,184,348 | 2/1993 | Abdelmouttalib et al. | 370/95.1 |
| 5,448,257 | 9/1995 | Margeson, III et al. | 345/3 |
| 5,539,465 | 7/1996 | Xu et al. | 348/388 |
| 5,550,381 | 8/1996 | Tanahashi | 370/95.3 |
| 5,651,121 | 7/1997 | Davies | 395/376 |
| 5,654,707 | 8/1997 | Matsumoto | 341/101 |
| 5,669,391 | 9/1997 | Williams | 128/697 |
| 5,680,400 | 10/1997 | York | 370/473 |
| 5,710,721 | 1/1998 | Rieckhoff et al. | 364/514 |
| 5,715,248 | 2/1998 | Lagle, III et al. | 370/366 |
| 5,727,233 | 3/1998 | Lynch et al. | 395/885 |

FOREIGN PATENT DOCUMENTS

| | | | |
|---|---|---|---|
| 0 428 407 A2 | 5/1991 | European Pat. Off. | H04J 3/16 |
| 0 447 054 A2 | 9/1991 | European Pat. Off. | H04J 29/06 |
| 41 24 761 A1 | 1/1993 | Germany | G06F 5/06 |
| 2 280 338 | 1/1995 | United Kingdom | H04M 11/06 |

OTHER PUBLICATIONS

Chatal, Joel. "Vollduplex–Controller fur ISDN–Zwei mehrkanalige HDLC–und V110–Controller mit integriertem Kontext–RAM." *Elektronik*. vol. 40, No. 19. Sep. 17, 1991. Munchen, DE. pp. 68–69, 74–75.

Primary Examiner—Thomas C. Lee
Assistant Examiner—Ilwoo Park
Attorney, Agent, or Firm—Frank D. Nguyen

[57] ABSTRACT

A computer system coupled to a network is disclosed which provides multiple paths for each serial input/output connection. In the receive mode, the current invention separates serial data frames which are composed of sub-functions/channels into sub-function data streams. The sub-function data streams can then be transferred out one at a time. In the transmit mode, the current invention forms data load patterns from the sub-function data streams. Each data load pattern is formed by selecting the appropriate binary bits from the sub-function data streams and arranging the binary bits selected in the sequence desired. The binary bits of each data load pattern are transmitted serially.

24 Claims, 11 Drawing Sheets

| B1 | B2 | MONITOR | D1 | B2 | C/I | A | E |
|---|---|---|---|---|---|---|---|
| 8 BITS @ 64K bps | 8 BITS @ 64K bps | 8 BITS @ 64K bps | 1 BIT @ 8K bps | 1 BIT @ 8K bps | 4 BITS @ 32K bps | 1 BIT @ 8K bps | 1 BIT @ 8K bps |

FIG. 2
(PRIOR ART)

| B1 | | | | | | | | B2 | | | | | | | | MONITOR | | | | | | | | D | | C/I | | | | A | E |
|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 0 | 1 | 2 | 3 | 4 | 5 | 6 | 7 | 0 | 1 | 2 | 3 | 4 | 5 | 6 | 7 | 0 | 1 | 2 | 3 | 4 | 5 | 6 | 7 |
| 1 | 1 | 1 | 1 | 1 | 1 | 1 | 1 | 1 | 1 | 1 | 1 | 0 | 0 | 1 | 1 | 0 | 0 | 0 | 0 | 0 | 0 | 0 | 0 | 1 | 1 | 0 | 0 | 0 | 0 | 0 | 0 |
| FF | | | | | | | | CF | | | | | | | | 00 | | | | | | | | | | 03 | | | | | |

FIG. 8

SYSTEM FOR STORING EACH OF STREAMS OF DATA BITS CORRESPONDING FROM A SEPARATOR THEREBY ALLOWING AN INPUT PORT ACCOMMODATING PLURALITY OF DATA FRAME SUB-FUNCTIONS CONCURRENTLY

FIELD OF THE INVENTION

The invention generally relates to communication devices, and more particularly relates to an arrangement having multiple virtual paths for each serial I/O controller channel.

BACKGROUND OF THE INVENTION

In the world of data communications, communications networks provide the connections necessary to link together communications nodes located anywhere in the world. Each communications node generally provides multiple connections thereby allowing multiple users to connect to the same communications node. A communications node typically includes a remote access server such as router or an integrated services digital network (ISDN) switch to allow remote connection to the node. A communications network, known as the "network cloud" that is capable of covering a geographical area ranging from a few miles to thousands of miles, couples the remote access server to individual users.

Prior Art FIG. 1 is a block diagram illustrating a communications network connection. At one end of the communications network connection is remote access server 100. Remote access server 100 typically includes serial I/O (SIO) controller 105. SIO controller 105 interfaces with network cloud 102 through modem bank 101. Modem bank 101 consists of multiple U and/or S/T interface chips which take a network connection such as an ISDN connection and converts the ISDN connection into a standard four-wire computer communications interface. In turn, network cloud 102 provides connections to individual users 103 and 104.

For ISDN connections, the interface standard for a connection between an SIO controller and a modem bank is either general circuit interface (GCI) or interchip digital link (IDL). In both GCI and IDL interface standards, an ISDN frame is composed of serialized digital signals which are categorized as individual sub-functions/channels such as B1, B2, D, and etc.

Referring now to Prior Art FIG. 2 in which an exemplary format of ISDN frame 200 using GCI interface standard is shown. As illustrated, ISDN frame 200 using GCI interface standard consists of B1, B2, Monitor, D, C/I, A, and E sub-functions/channels in this sequential order. Briefly, the B1 and B2 sub-functions may carry either voice or data. The Monitor sub-function carries out-of-band channel signaling. The D sub-function is used to monitor changes in the ISDN line. The C/I sub-function carries control and indication signals. Finally, the A and E sub-functions are the acknowledgment and enable signals for handshake purposes. Each of the B1, B2, or Monitor sub-functions is eight bits wide. The D sub-function is two bits wide, the C/I function is four bits wide, and each of the A and E sub-functions is one bit-wide. The D, C/I, A, and E sub-functions make up what is known as the signaling and control octet. The bandwidth for each of the B1, B2, and Monitor sub-function is 64 Kbps. The bandwidth for the D sub-function, C/I sub-function, and combined A and E sub-functions is 16, 32, and 16 Kbps, respectively.

In the prior art, an SIO controller assigns a communications channel to each sub-function thereby making inefficient use of this scarce resource. Take, for example, the MC68360 QUICC, an SIO controller manufactured by Motorola Corporation of Schaumberg, Ill. Reference is now made to Prior Art FIG. 3 which illustrates an ISDN connection to the MC68360 QUICC chip. In Prior Art FIG. 3, an ISDN connection having IDL interface standard is provided to S/T interface chip 304. As discussed earlier, IDL serialized digital signals are categorized into B1, B2, and D sub-functions. S/T interface chip 304 routes sub-function B1 to voice compression/decompression (codec) circuit 302 and sub-functions B2+D to MC68360 QUICC SIO controller 300. More specifically, sub-functions B2+D are routed to a time slot assignment (TSA) circuit 301 which is part of MC68360 QUICC SIO controller 300. TSA circuit 301 then routes B2 sub-function and D sub-function to two different SIO ports, also known as serial communications controllers (SCC), 306 and 307. As such, TSA circuit 301 and SCCs 306 & 307 are separate from each other. As shown in Prior Art FIG. 3, a separate SIO port is used for each ISDN sub-function. Such inefficient use of SIO ports is exacerbated when multiple ISDN connections are involved. Moreover, the International Telecommunications Union (ITU) standard I.460 allows for further sub-division of B sub-functions such that a single B sub-function of 64 Kbps can be further divided into sub sub-functions of 8 Kbps increments. Therefore, as many as eight (8) separate SIO ports may be required to accommodate a single 64 Kbps B sub-function. Hence, it can be seen that conventional systems can rapidly exhaust available SIO ports. Thus, a need exists for a single SIO port which can handle multiple sub-functions of an ISDN frame.

SUMMARY OF THE INVENTION

Accordingly, the present invention provides a communications arrangement which allows a single SIO port to handle multiple sub-functions of an ISDN frame.

The present invention meets the above need with an input port which is coupled to a memory device, a program memory, a processor, and a serial communications connection. The serial communications connection supplies data frames having a plurality of sub-functions composed of data bits. The input port has a receiver circuit, a separator, and a data storage circuit. The receiver circuit coupled to the serial communications connection to receive data frames from the serial communications connection. The separator is in communication with the receiver circuit to receive as input data frames from the receiver circuit. The separator then separates the sub-functions of the data frames into corresponding streams of serial data bits. The data storage circuit consists of a plurality of data storage devices and is in communication with the separator to receive and store the streams of serial data bits from the separator.

The present invention further meets the above need with an output port which is coupled to a serial communications connection, a processor, a program memory, and a memory device. The memory device is used to store streams of serial data bits representing sub-functions of a data frame. The output port consists of a data storage circuit, a combiner, and a transmitter circuit. The data storage circuit is made up of a plurality of data storage devices and is coupled to the memory device to receive and store the streams of serial data bits from the memory device. The combiner is in communication with the data storage circuit to receive as input data bits of the streams of serial data bits stored in the data storage circuit. The combiner used the received streams of serial data bits to generate data load patterns. The transmitter circuit is in communication with the combiner and is coupled to the serial communications connection. The transmitter circuit receives the data load patterns from the combiner and serially outputs the data bits of each data load pattern in a desired order to form a data frame.

All the features and advantages of the present invention will become apparent from the following detailed description of its preferred embodiment whose description should be taken in conjunction with the accompanying drawings.

BRIEF DESCRIPTION OF THE DRAWINGS

Prior Art

Prior Art FIG. 2 is a block diagram illustrating the format of an ISDN frame incorporating the GCI interface standard.

Prior Art

FIG. 8 is a diagram illustrating an exemplified bit mask value.

DETAILED DESCRIPTION OF THE INVENTION

Figure 1:
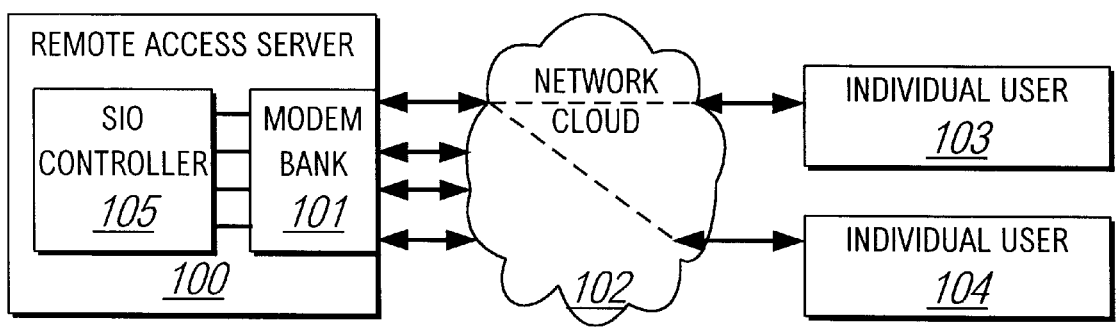
FIG. 1 is a block diagram illustrating a communications network connection.
Figure 3:
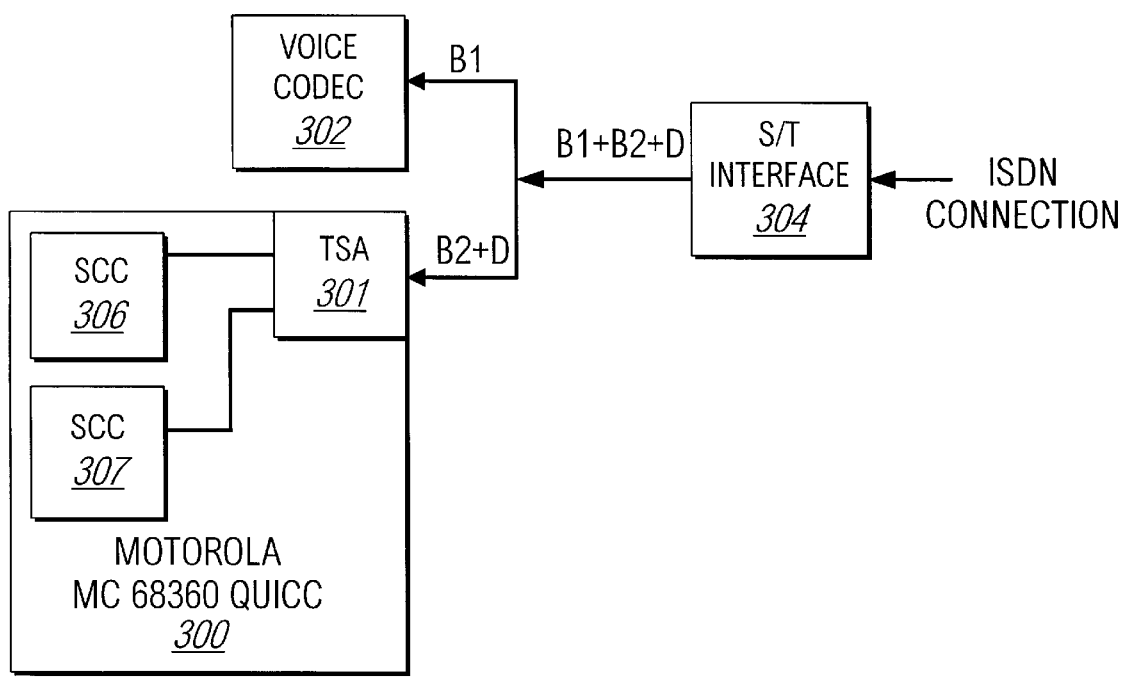
FIG. 3 is a block diagram illustrating the prior art illustrating an ISDN connection to the Motorola MC68360 QUICC chip.
Figure 4:
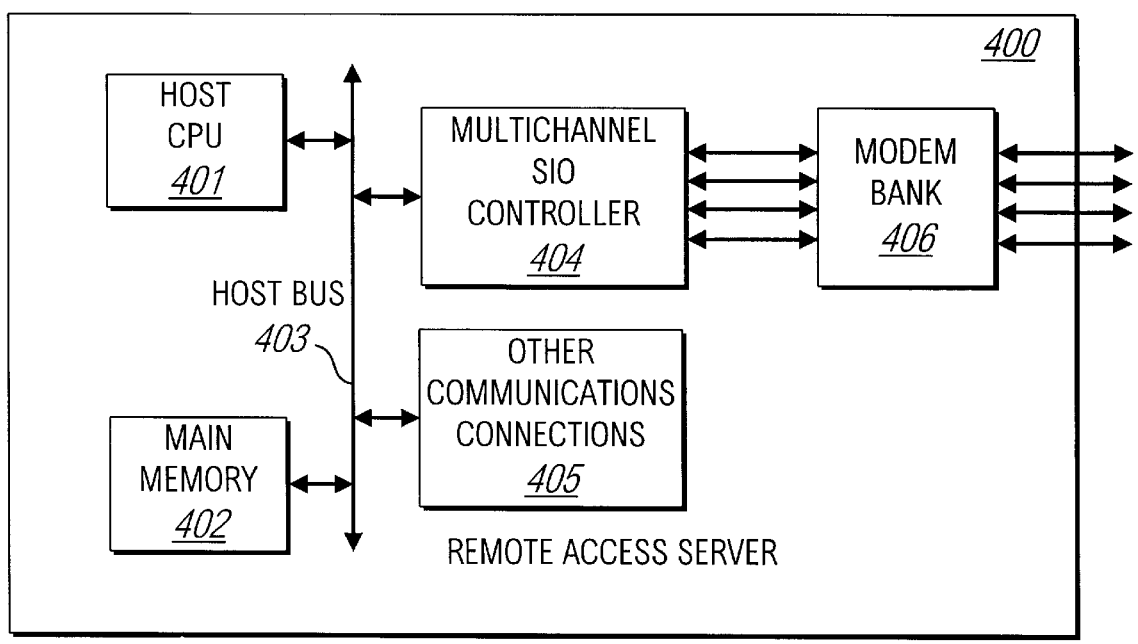
FIG. 4 is a block diagram illustrating a typical remote access server such as an ISDN switch.

Reference is now made to FIG. 4 which is a block diagram of a remote access server in which the current invention can be implemented. In the preferred embodiment, the current invention is implemented as a part of a multi-channel SIO controller. Although the current invention may be used as part of an ISDN network, it can be used in many other network applications as well.

Remote access server 400, which can be an ISDN switch, consists of host CPU 401, main memory 402, host CPU bus 403, multi-channel serial I/O (SIO) controller 404, other communications connections 405, and modem bank 406. Host CPU 401, main memory 402, multi-channel SIO controller 404, and other communications connections 405 are coupled together by host CPU bus 403. Host CPU 401 oversees the operations of multi-channel SIO controller 404 and handles the routing decisions. Main memory 402 stores the firmware and data utilized by host CPU 401 to control and monitor multi-channel SIO 404. Additionally, main memory 402 stores data transferred to and from multi-channel SIO controller 404. Multi-channel SIO controller 404 performs such tasks as serial and parallel conversion, time slot assignment, bit level protocol processing, and error checking. Other communications connection 405 may be a local area network (LAN), a primary rate interface (PRI), or other SIO channels. For reference, the present invention is implemented a part of multi-channel SIO controller 404.

Figure 5:
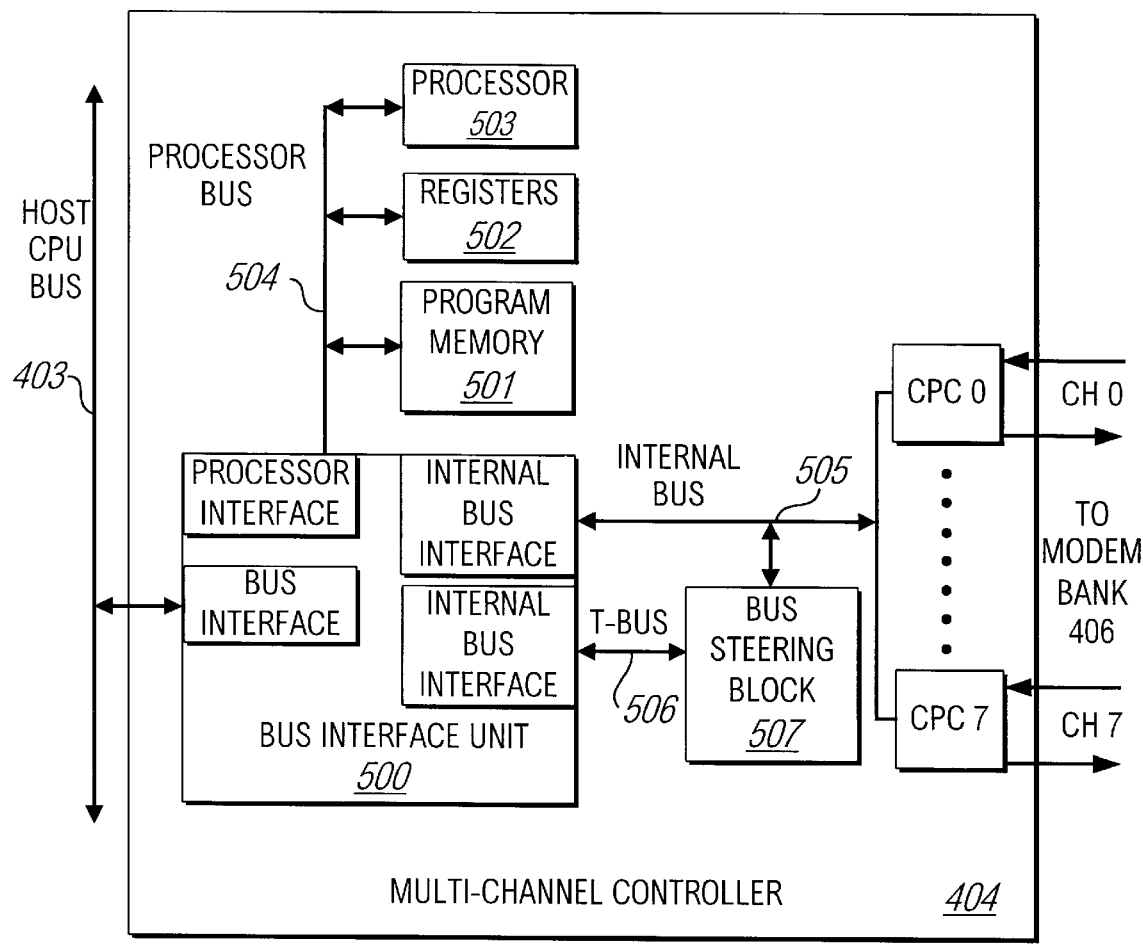
FIG. 5 is a block diagram illustrating a multi-channel SIO controller which is implemented as part of an ISDN switch.

FIG. 5 illustrates, in more detail, multi-channel SIO controller 404 which is coupled at one end to host CPU bus 403 and at the other end to modem bank 406. An example of a host CPU bus is a peripheral component interface (PCI) bus. Host CPU bus 403 is connected to bus interface unit 500 which provides the interface between high-speed host CPU bus 403 and internal buses. Internal buses of multi-channel SIO controller 404 include processor bus 504, internal chip bus 505, and turbo-bus (T-Bus) 506.

Processor bus 504 connects program memory 501, registers 502, and processor 503 to bus interface unit 500. Processor 503 controls the data transfer between SIO ports/communication processor controller (CPC) channels and host CPU bus 403 by communicating and coordinating with the SIO ports/CPC channels. For reference, the present invention is implemented as a part of SIO ports/CPC channels. Processor 503 also performs programmed tasks as dictated by firmware codes stored in program memory 501. Registers 502 include both command and status registers. Command registers are used to store operating conditions and configurations of individual SIO port/CPC channel that have been down loaded by host CPU 401. Status registers are used to store the status of multi-channel SIO controller 404 for uploading to host CPU 401.

Internal chip bus 505 connects the SIO ports/CPCs and bus steering block 507 to bus interface unit 500. Bus steering block 507 is also connected to bus interface unit 500 by T-Bus 506. As such, there are two paths that can be used to transfer data between host CPU bus 403 and the SIO ports/CPC channels. Data may follow the route from host CPU bus 403 to bus interface unit 500 which then sends the data over internal chip bus 505 to SIO ports/CPC channels. Alternately, data may also follow the route from host CPU bus 403 to bus interface unit 500 which then sends the data over T-Bus 506 to bus steering block 507 which in turn sends the data over internal chip bus 505 to the SIO ports/CPC channels. Bus steering block 507 has a programmable size first-in-first-out (FIFO) buffer to control the rate of data flow by monitoring data flow and storing overflow data to avoid data loss.

In the preferred embodiment, multi-channel SIO controller has eight SIO ports/CPC channels (i.e., channels 0 to channels 7). Each SIO port/CPC has separate receive and transmit channels as well as associated FIFOs. In addition to receiving data signal, RxDATA, each SIO port/CPC channel also receives, as inputs, an ISDN frame synchronous signal SYNC and clock signal, ICLK, which is twice as fast as the ISDN bit rate, from either S/T or U interface chip in modem bank 406. Each SIO port/CPC channel outputs transmit data signal TxDATA to either S/T or U interface chip in modem bank 406 of FIG. 4. Preferably, RxDATA, TxDATA, ICLK, and SYNC signals are serial interface signals of GCI interface standard. Alternately, serial interface signals of IDL interface standard can also be used with very little modifications.

Moreover, in the preferred embodiment, each SIO ports/CPC channel has four virtual transmit paths and four virtual receive paths. In other words, each SIO ports/CPC channel can handle up to four ISDN frame sub-functions in each direction. As a result, the current invention can handle up to 32 ISDN frame sub-functions concurrently. It should be clear to a person of ordinary skill in the art that each SIO ports/CPC channel can be designed to have any number of virtual paths.

Figure 6:
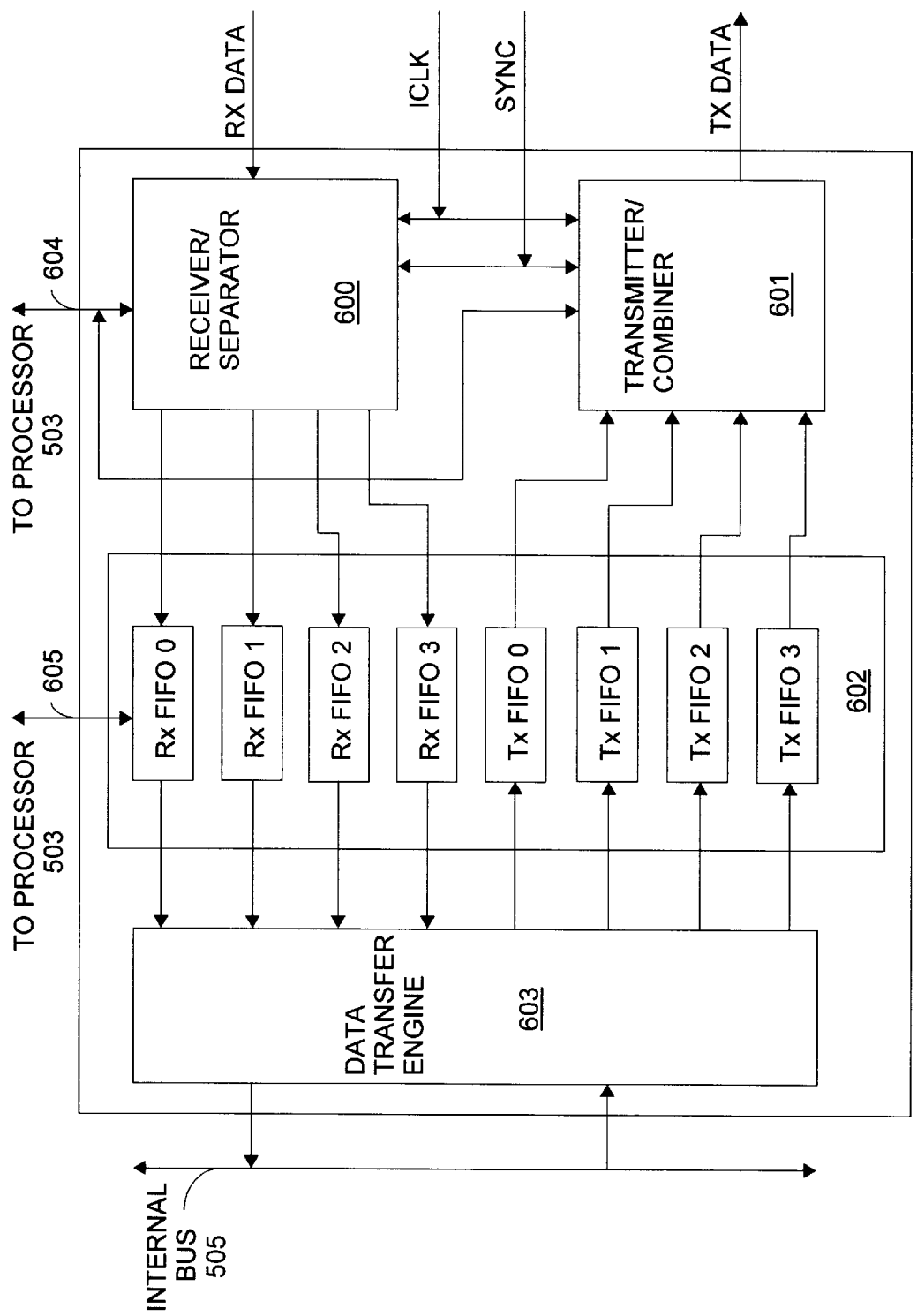
FIG. 6 is a block diagram illustrating an SIO port/CPC channel of the multi-channel SIO controller shown in FIG. 5 incorporating the current invention.

Reference is now made to FIG. 6 which illustrates the preferred embodiment of the present invention located inside SIO port/CPC channel 0 of multi-channel SIO controller 404 of FIG. 4. Because SIO ports/CPC channels 1–7 are identical to SIO port/CPC channel 0, they will not be described further. Also, for the sake of clarity, other elements of an SIO port/CPC channel not relevant to the current invention are omitted in FIG. 6.

SIO port/CPC channel 0 comprises data transfer engine 603, data path virtual block 602, receiver/separator 600, and transmitter/combiner 601. Data transfer engine 603 is connected to internal bus 505 and controls data transfer in and out of SIO port/CPC channel 0. Data transfer engine 603 can be one of three types: program controlled (i.e., polling), interrupt-program controlled (i.e., interrupt service subroutine), or direct memory access (DMA). These three types of i/o data transfer are well-known to a person of ordinary skill in the art and integrated circuits embodying any one of these three types of i/o data transferring are available commercially. Detailed descriptions for these three types of i/o data transfer can be found, for example, in Kenneth L. Short, "Microprocessors and Programmed Logic" 270–360 (2d ed. 1987) which is herein incorporated by reference as background material. In the preferred embodiment of the present invention, data transfer engine 603 is a DMA engine.

Data path virtual block 602 comprises a number of FIFO buffers. Preferably, data path virtual block 602 consists of eight (8) FIFO buffers, four (4) FIFO buffers for receiving and four (4) FIFO buffers for transmitting. Each FIFO buffer is designed to accommodate a data stream representing a sub-function in a data frame. As such, each FIFO buffer is at least eight (8) bit-wide and preferably thirty-two (32) bit-deep. However, FIFO buffers that are more than eight (8) bit-wide and/or more than thirty-two (32) bit-deep are also acceptable. Each receive FIFO buffer is connected at one end to data transfer engine 603 and at the other end to receiver/separator 600. Each transmit FIFO buffer is connected at one end to data transfer engine 603 and at the other end to transmitter/combiner 601. By having separate transmit and receive FIFO buffers, data path virtual block 602 allows both transmission and reception of data at the same time. Moreover, having four receive buffers and four transmit buffers means that each SIO port/CPC channel in the present invention can accommodate up to four data streams representing four data frame sub-functions at any one time. It should be clear to a person of ordinary skill in the art that data path virtual block 602 can have any number of receive and transmit FIFO buffers. Thus, any number of sub-function data streams can be supported on one SIO port/CPC channel.

Receiver/separator 600 receives as input signals RxDATA, ICLK, SYNC, and signal 604. Transmitter/combiner 601 receives as input signals ICLK, SYNC, and signal 604. Transmitter/combiner 601 generates output signal TxDATA. Receiver/separator 600 and transmitter/combiner 601 are described in details in FIGS. 7 and 10, respectively.

In the receiving mode, receiver/separator 600 of SIO port/CPC channel 0 receives as inputs receive data signal RxDATA representing ISDN data frame, clock signal ICLK, and synchronous signal SYNC from modem bank 406. With the help from processor 503, receiver/separator 600 physically separates the ISDN data frames into their sub-functions and sends them to the desired receive FIFO buffers in virtual path block 602. In doing so, ISDN data frames are divided into separate sub-function data streams. Synchronous signal SYNC provides a start indicator for the ISDN frame received to aid in the shifting and loading of bits. Clock signal ICLK provides the timing signal. Signal 604 provides direct interface between receiver/separator 600 and processor 503.

Each sub-function received from receiver/separator 600 is formatted in either high level data link control (HDLC), synchronous point-to-point protocol (PPP), asynchronous, signaling system 7 (SS7), or any other communications protocol. It is to be appreciated that HDLC, PPP, SS7, and asynchronous are industry accepted data transmision protocols that are well-known to a person of ordinary skill in the art. Under the control of processor 503 through signal 605, a formatted sub-function stored in virtual path block 602 is first stripped of its format before the stripped sub-function is sent to data transfer engine 603 for transfer to main memory. For example, if the sub-function was configured in an asynchronous format, the formatted sub-function is stripped of the start, stop, and parity bit.

In the transmit mode, data transfer engine 603 receives stripped sub-functions from main memory and passes them on to virtual path block 602. Processor 503 configures the sub-functions in their desired format. Processor 503 then sends the formatted sub-function to transmitter/combiner 601. Transmitter/combiner 601 with the help of processor 503 combines the sub-functions received into a single ISDN frame and outputs it as transmit data signal TxDATA to modem bank 406.

Processor 503 executes the firmware stored in program memory 501 to format or strip the format of the sub-functions in virtual path block 602. Program memory 501 stores different firmware to configure and de-configure the sub-functions in virtual path block 602 for any of the following protocols: HDLC, synchronous, PPP, asynchronous, and SS7. Because all of these protocols are industry standard, the method steps to format a sub-function or strip it of the format are well-known in the art. For this reason, the formatting and format stripping firmware are not discussed any further.

Figure 7:
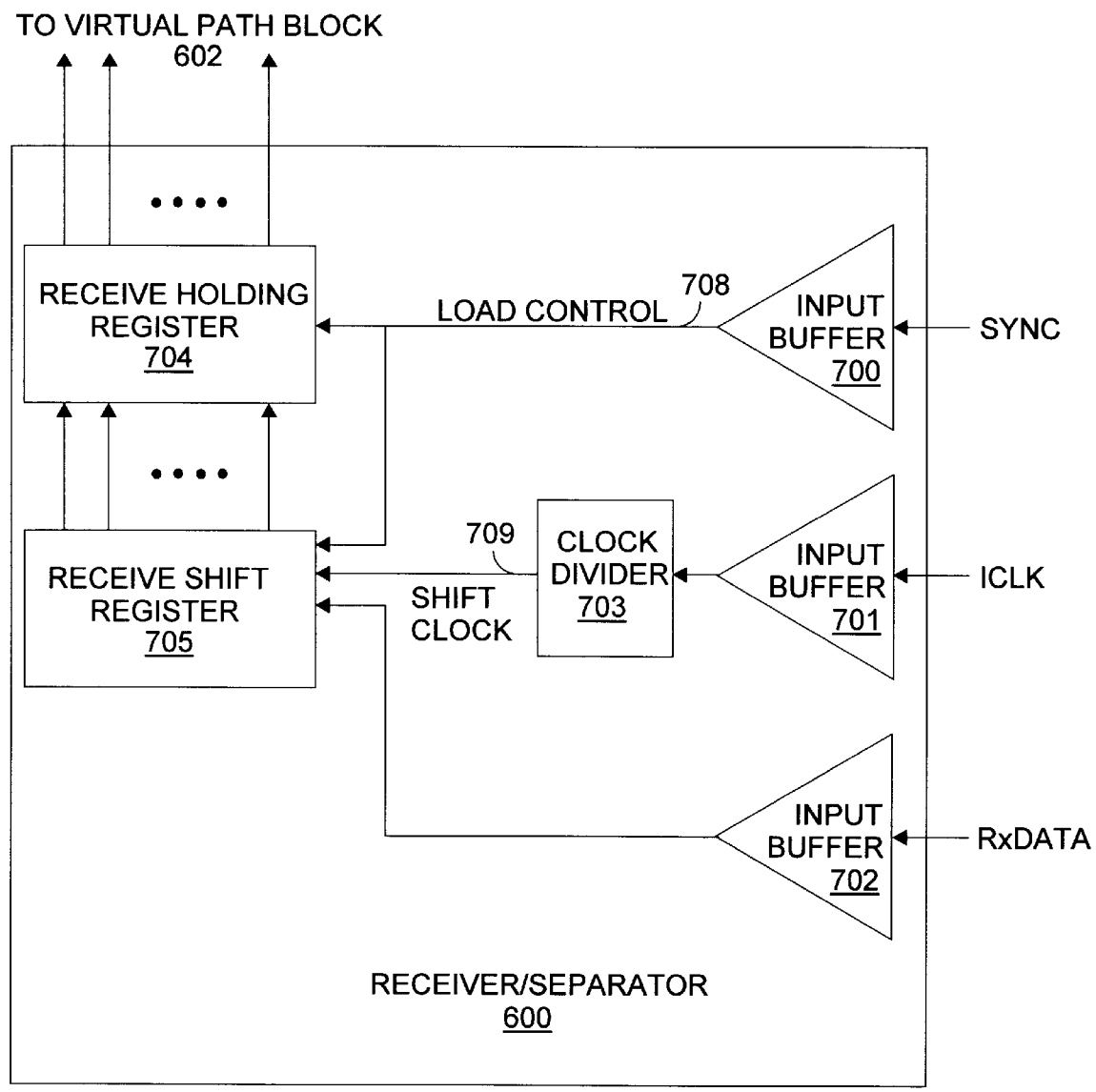
FIG. 7 is a block diagram illustrating the preferred embodiment of the receiver/separator of the SIO port/CPC channel shown in FIG. 6.

Referring now to FIG. 7 which is a block diagram illustrating the preferred embodiment of receiver/separator 600. As shown, synchronous signal SYNC, clock signal ICLK, and receive data signal RxDATA are provided first as inputs to input buffers 700, 701, and 702 respectively. Input buffers, such as these, are typically used in VLSI products for impedance matching purpose. Input buffer 700 provides as its output load control signal 708 to receive shift register 705 and receive holding register 704. Load control signal 708 synchronizes receive holding register 704 and receive shift register 705 to the start of a GCI frame. Input buffer 701 provides its output to clock divider 703 which reduces clock signal ICLK in half and outputs shift clock signal 709 to receive shift register 705. As discussed earlier, the clock signal ICLK is two times the bit rate of receive data signal RxDATA. For this reason, at half the speed of clock signal ICLK, shift clock signal 709 is equal to the bit rate of receive data signal RxDATA. Input buffer 702 provides its output serially to receive shift register 705.

In the preferred embodiment, receive shift register is 32-bit wide to fully accommodate a GCI frame which is 32-bit wide. Shift clock signal 709 and load control signal 708 cause receive data signal RxDATA to shift serially into receive shift register 705. After 32 bits are shifted into receive shift register 705, the contents of receive shift register 705 are loaded in parallel to receive holding register 704.

Next, a receive bit mask is used to mask out selected bits in receive holding register 704. The remaining bits in receive holding register 704 are then categorized into sub-functions and routed to the desired receive FIFO buffers in virtual path block 602. In the preferred embodiment of the present invention, this task is carried out by processor 503 performing the steps in a firmware program stored in program memory 501. A sample firmware program is described below. It should be clear to a person of ordinary skill in the art that the steps to handle the above task can easily be implemented in hardware as well.

The firmware program assumes that there are four (4) receive virtual paths and that receive holding register 704 is 32 bit-wide. For this program, virtual path 0 is chosen to accommodate all 8 bits of sub-function B1 at 64 Kbps; virtual path 1 is chosen to accommodate 4 bits (bits 0, 1, 2, 3) of sub-function B2 at 32 Kbps; virtual path 2 is chosen to accommodate 2 bits (bits 6 and 7) of sub-function B2 at 16 Kbps; and virtual path 3 is chosen to accommodate 2 bits of sub-function D at 16 Kbps. Notice that bits 4 and 5 of sub-function B2, sub-function Monitor, sub-function C/I, sub-function A, and sub-function E are excluded this example.

A bit is masked when the corresponding bit in the receive bit mask has a value of zero. In light of this and the format of an ISDN frame having a GCI interface standard, the bit mask value for this example is FF-F3-00-C0 in hexadecimal when reading from left to right. When reading from right to left, the bit mask value is 03-00-CF-FF. FIG. 8 illustrates the bit mask of an ISDN frame in GCI interface standard for the above example. In FIG. 8, the GCI frame has its first frame bit on the left. In addition to showing the bit mask value associated with each bit number, FIG. 8 also shows the Hex mask value as well as the demarcation lines for the sub-functions.

To generate the bit mask value, host CPU 401 first communicates to processor 503 the desired sub-functions to retrieve. This is done through set-up and configurations registers which is a well-known practice familiar to anyone acquainted with microprocessor peripheral design. Next, processor 503 converts the values of these registers to a bit mask value through a firmware mapping task which is also well known in the art. This bit mask value is then loaded into a receive mask register (not shown).

Figure 9:
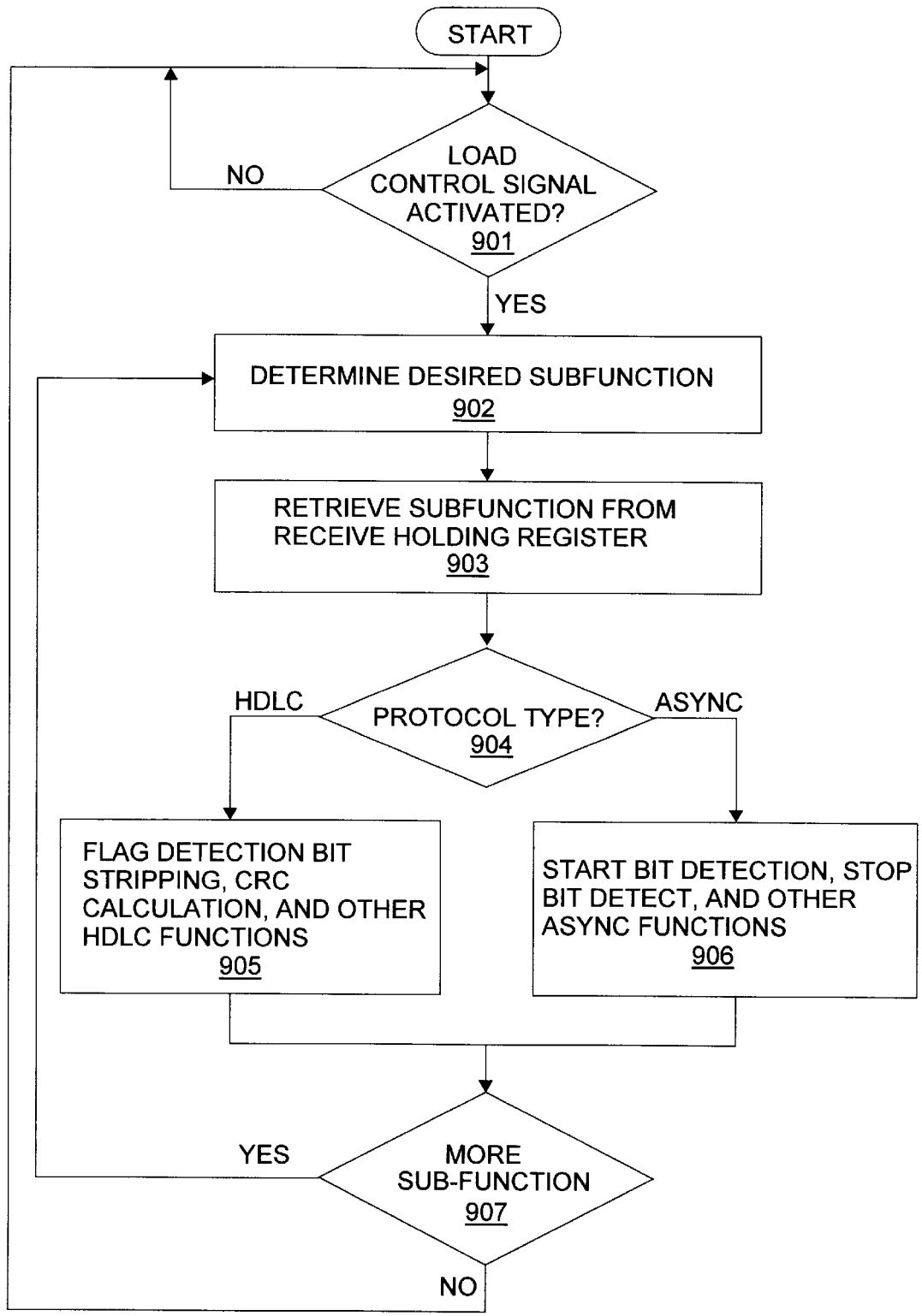
FIG. 9 is a flow chart of the firmware used by the processor in conjunction with the receiver/separator hardware in FIG. 7 to separate the sub-functions into individual data streams.

Referring now to FIG. 9 which is a flow chart of the firmware program for separating the sub-functions of an GCI data frame into individual data streams. In step 901, processor 503 monitors load control signal 708 to determine whether it is activated. When load control signal 708 is activated indicating that a GCI frame has been received in receive holding register 704, work can begin to separate the sub-functions into individual data streams. Otherwise, processor 503 continues to monitor load control signal 708.

Upon learning that a GCI frame has been loaded into receive holding register 704, processor 503 determines which sub-function and how many bits to retrieve (step 902). Generally, this information is provided to processor 503 from host CPU 401 based on pre-programmmed values. Next, a predetermined number of bits of a specific sub-function are retrieved from receive holding register 704 and placed in a predetermined receive FIFO in virtual path block 602 (step 903). It may be necessary for processor 503 to retrieve sub-function bits from more than one GCI frame. In doing so, bits from each sub-function form a separate serial data stream.

Procesor 503 then determines from information provided by host CPU 401 the protocol type (step 904). In the preferred embodiment, only two protocol types, HDLC or asynchronous, are involved. This is in part because synchronous PPP and SS7 are applications of the so-called bit stuffing HDLC protocol. It is to be appreciated that each sub-function in a GCI frame may be of a different protocol. If an HDLC protocol is involved, processor 503 performs step 905 which includes well-known tasks such as detecting and removing flag, stripping zero bits, removing cyclic redundancy code (CRC), and other HDLC protocol functions. If an asynchronous protocol is involved, processor 503 performs step 906 which includes well-known tasks such as start bit & stop bit detection and removal, parity check, and other asynchronous protocol functions. In performing steps 905 or 906, processor 503 performs a serial-to-parallel conversion on the sub-function. The conversion is necessary to properly align and format the data received. It is to be appreciated that data bits from more than one GCI frame may be required for data conversion.

Upon performing the conversion, processor 503 determines whether any additional sub-function is to be retrieved from the current GCI frame (step 907) based on information provided by host CPU 401. If more sub-function of the current GCI frame is required, processor 503 goes back to step 902. Otherwise, processor 503 goes back to step 901 to monitor for the download of the next GCI frame.

Figure 10:
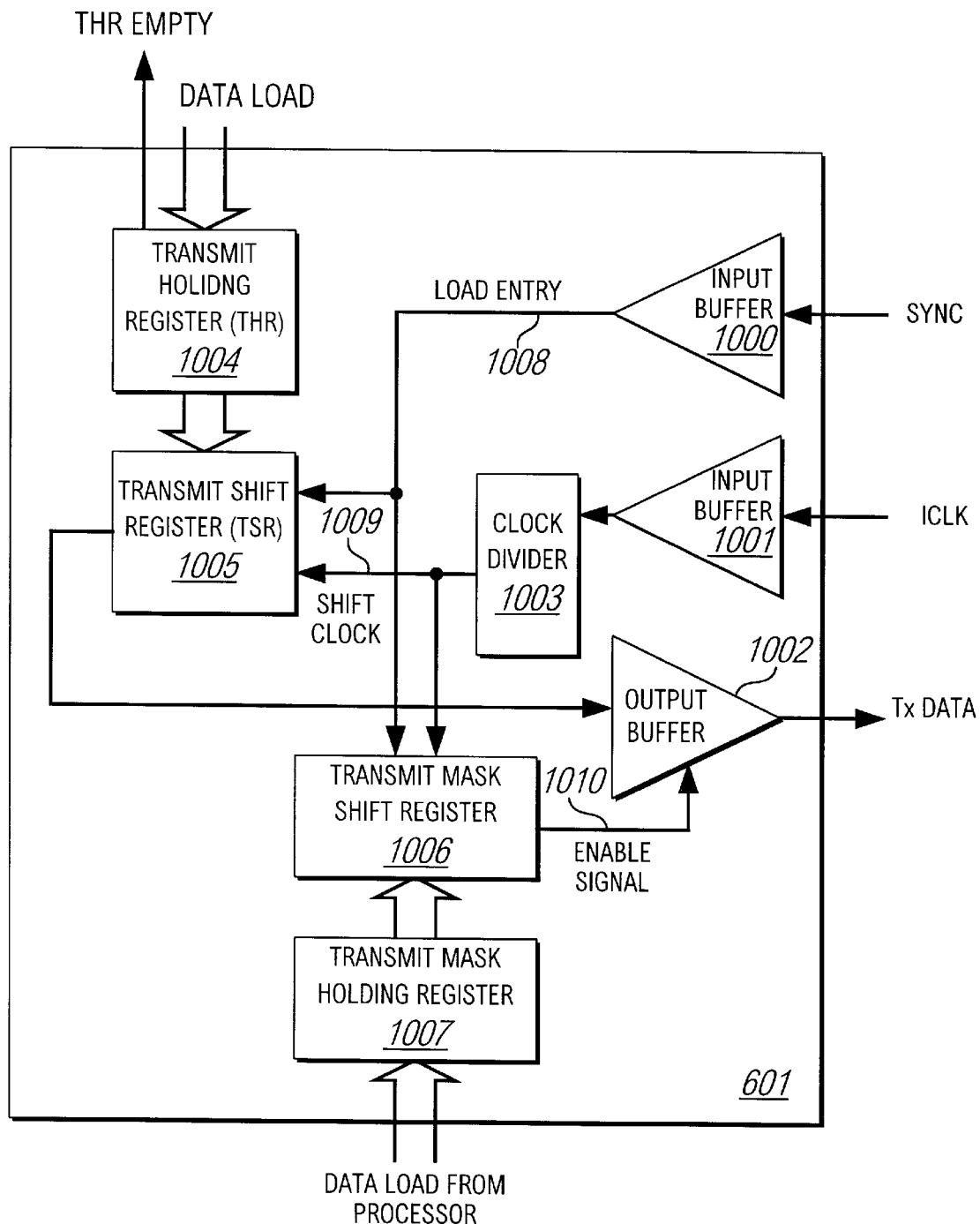
FIG. 10 is a block diagram illustrating the preferred embodiment of the transmitter/combiner of the SIO port/CPC channel shown in FIG. 6.
Figure 11:
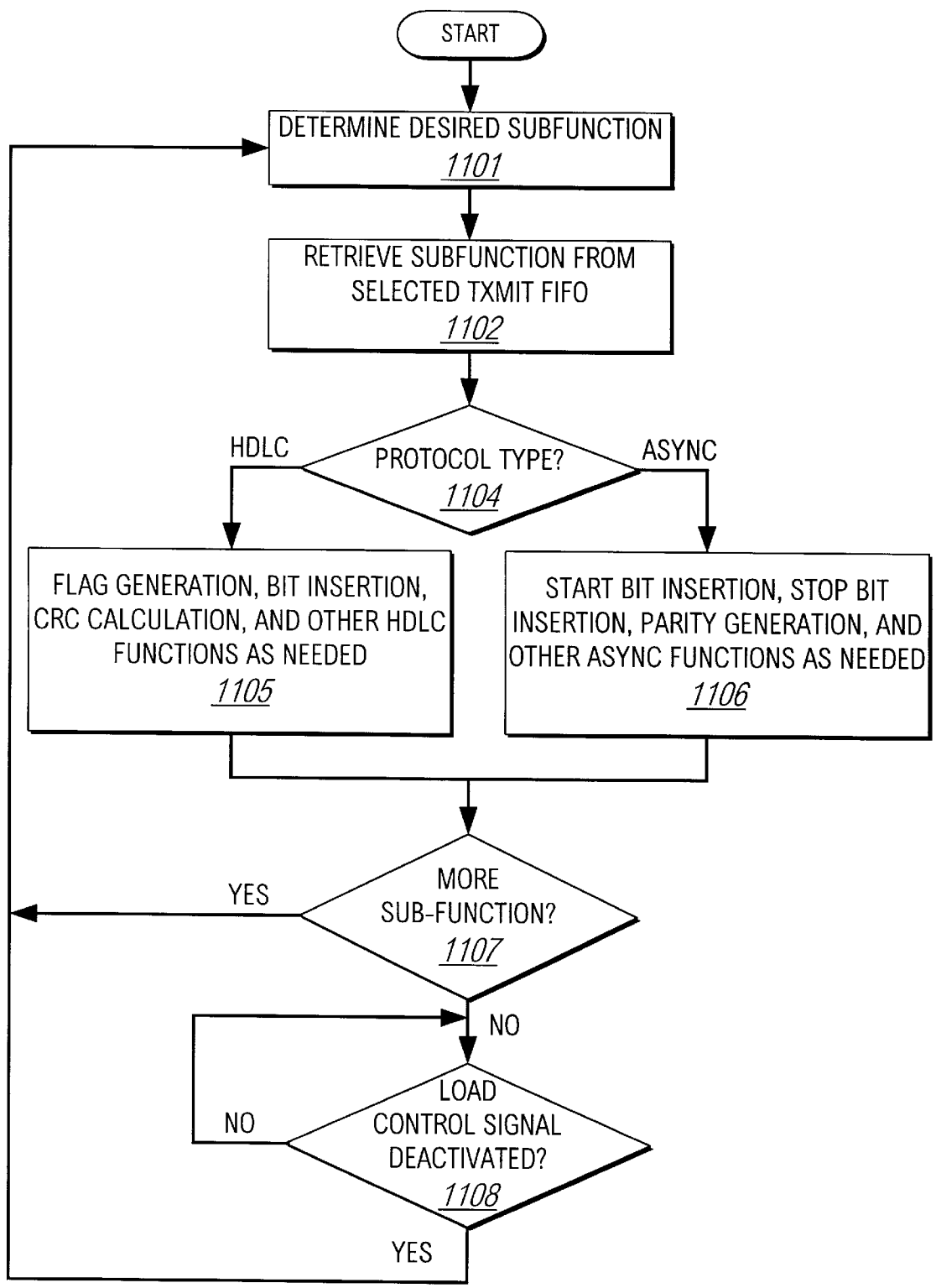
FIG. 11 is a flow chart of the firmware used by the processor in conjunction with the transmitter/combiner hardware in FIG. 10 to combine the data streams into an ISDN frame.

FIG. 10 illustrates the preferred embodiment of transmitter/combiner 601. As shown, upon learning from the transmit holding register (THR) empty signal that transmit holding register 1004 is empty, processor 503 downloads a data load pattern into transmit holding register 1004 which is preferably 32 bit-wide. In the preferred embodiment, the data load pattern in created by processor 503 executing the steps of a firmware program stored in program memory 501. However, it should be clear to a person of ordinary skill in the art that the steps of the firmware program can be implemented in hardware as well. FIG. 11 which is a flow chart of the firmware program for combining individual sub-function data streams into a GCI data frame.

Before executing the steps of the firmware program, a bit mask value is first generated. Host CPU 401 first communicates to processor 503 the sub-functions to put in the constructed GCI frame. This is done through set-up and configurations registers which is a well-known practice familiar to anyone acquainted with microprocessor peripheral design. Next, processor 503 converts the values of these registers to a bit mask value through a firmware mapping task which is also well known in the art. This bit mask value is then loaded into transmit mask holding register 1007 in FIG. 10.

At this time, the firmware program of FIG. 11 can be executed. In step 1101, processor 503 determines which sub-function and how many bits to retrieve from which TxFIFO of virtual path block 602. Generally, this information is provided to processor 503 from host CPU 401 based on pre-programmmed values. Next, data bits of a specified sub-function are retrieved from a predetermined transmit FIFO in virtual path block 602 (step 1102) and stored in a temporary holding register (not shown).

Procesor 503 then determines from information provided by host CPU 401 the protocol type (step 1104). In the preferred embodiment, only two protocol types, HDLC or asynchronous, are involved. This is in part because synchronous PPP and SS7 are applications of the so-called bit stuffing HDLC protocol. It is to be appreciated that each sub-function in a GCI frame may be of a different protocol. If an HDLC protocol is involved, processor 503 performs step 1105 which includes well-known tasks such as flag insertion, zero bit insertion, CRC generation, abort generation, idle generation, and other HDLC protocol functions on the sub-function data stored in the temporary holding register. If an asynchronous protocol is involved, processor 503 performs step 1106 which includes well-known tasks such as start bit insertion, stop bit insertion, parity generation and other asynchronous protocol functions the sub-function data stored in the temporary holding register. In performing steps 1105 or 1106, processor 503 performs a parallel-to-serial conversion on the sub-function data. The conversion is necessary to convert the data into the proper HDLC or asynchronous format prior to transmission.

Upon performing the conversion, processor 503 determines whether any additional sub-function is to be retrieved from the any based on information provided by host CPU 401 (step 1107). If more sub-function of the current GCI frame is required, processor 503 goes back to step 1101. Otherwise, processor 503 goes to step 1108 to monitor load control signal 1008. The formatted sub-function data is first transferred into transmit holding register 1004. If load control signal 1008 is activated indicating that the formatted data for the sub-functions stored in transmit holding register 1004 has loaded into transmit shift register 1005 and the bit mask value has been loaded into transmit mask shift register 1006, the hardware portion of transmit/combiner circuit 601 takes over and the firmware program goes into a wait loop. If load control signal 1008 is deactivated indicating that the hardware portion of circuit 601 has completed its task, then the firmware program resumes its operations.

Referring now back to FIG. 10 for a description of the hardware part of transmitter/combiner circuit 601, synchronous signal SYNC and clock signal ICLK are provided as inputs to input buffers 1000 and 1001 respectively to compensate for the difference in clock rate between transmitter/combiner 601 and modem bank 406. Input buffer 1000 provides as its output load control signal 1008 to transmit shift register 1005 and transmit mask shift register 1006. Load control signal 1008 indicates to transmit shift register 1005 and transmit mask shift register 1006 the start of an GCI frame. As such, clock divider 1003, transmit shift register 1005, and transmit mask shift register 1006 are synchronized to this key event.

Input buffer 1001 provides its output to clock divider 1003 which reduces clock signal ICLK in half and outputs shift clock signal 1009 to transmit shift register 1005 and transmit mask shift register 1006. Since the clock signal ICLK is two times the bit rate of transmit data signal TxDATA, at half the speed of clock signal ICLK, shift clock signal 1009 is equal to the bit rate of transmit data signal TxDATA.

The content of transmit holding register 1004 is provided as parallel input to transmit shift register 1005. However, the content of transmit holding register 1004 is not loaded into transmit shift register 1005 until load control signal 1008 indicates the start of a new GCI frame. At this time, the content of transmit shift register 1005 is bit shifted (i.e., serially) at each clock signal of shift clock signal 1009 into output buffer 1002. Output buffer 1002 supplies transmit data signal TxDATA at its output to modem bank 406. Output buffer 1002 is a three-states device which allows its input, regardless of whether it is a one or zero, to pass through as its output if enable/disable signal 1010 is enable. On the other hand, output buffer 1002 supplies a high impedance signal at its output. To make efficient use of a shared TxDATA line, when output buffer 1002 outputs a high impedance signal indicating that the TxDATA line is free, another connected channel is allowed to use the TxDATA line.

Processor 503 downloads the desired transmit bit mask in parallel into transmit mask register 1007 which supplies its content as input to transmit mask shift register 1006. However, the transmit bit mask is not loaded into transmit mask shift register 1006 until load control signal 1008 indicates the start of a new GCI frame. At this time, the transmit bit mask is shifted serially out of transmit mask shift register 1006 as output enable/disable signal to output buffer 1002.

As discussed above, the preferred embodiments of receiver/separator 600 and transmitter/combiner 601 can accommodate a 32 bit-wide GCI frame. However, it is clear to a person of ordinary skill in the art that slight modifications can be made to receiver/separator 600 and transmitter/combiner 601 such that they can accommodate any number of bits.

While the preferred embodiment and various alternative embodiments of the invention has been disclosed and described in detail herein, it will be obvious to those skilled in the art that various changes in form and detail may be made therein without departing from the spirit and scope thereof. Moreover, it is to be understood that the detailed description of the present invention above is by way of illustration and example only and is not to be taken by way of limitation, the spirit and scope of the present invention being limited only by the terms of the appended claims.

What is claimed is:

1. An input port coupled to a memory device, a program memory, a processor, and a serial communications connection supplying data frames comprising a plurality of sub-functions each composed of a plurality of data bits, the input port comprising:

a receiver circuit coupled to the serial communications connection, the receiver circuit receiving data frames from the serial communications connection;

a separator in communication with the receiver circuit, the separator adapted to receive as input data frames from the receiver circuit, the separator further adapted to separate the sub-functions of the data frames into corresponding streams of serial data bits; and a data storage circuit comprising a plurality of data storage devices, the data storage circuit in communication with the separator and adapted to concurrently receive the streams of serial data bits representing data frame sub-functions from the separator thereby allowing the input port to accommodate the plurality of data frame sub-functions concurrently.

2. The input port of claim 1, wherein the receiver circuit comprising:

a receive shift register connected to the serial communications connection, the receive shift register serially receiving in response to a shift clock signal and storing data frame bits from the serial communications connection; and a receive holding register coupled to the receive shift register for downloading the data frame bits stored in the receive shift register in response to a control signal, the receive holding register supplying the data frame bits to the data storage circuit.

3. The input port of claim 1, wherein the separator comprising instruction codes stored in the program memory, the instruction codes when executed by the processor separate the sub-functions of the data frames into corresponding streams of serial data bits.

4. The input port of claim 1, wherein each of the data storage devices storing one of the streams of serial data bits.

5. The input port of claim 2, wherein the control signal being derived from a data frame start signal.

6. The input port of claim 2, wherein the receiver circuit further comprises a clock divider receiving a clock signal from the serial communications connection, the clock divider adjusting the clock signal from the serial communications connection and supplying the adjusted signal to receive shift register for use as the shift clock signal.

7. The input port of claim 1 further comprising an i/o data transfer circuit coupled to the processor, the memory device, and the data storage circuit, the data transfer circuit configured to select and transfer one stream of serial data bits associated with a sub-function to the memory device at a time.

8. An output port coupled to a serial communications connection, a processor, a program memory, and a memory device storing streams of serial data bits representing sub-functions of a data frame, the output port comprising:
   a data storage circuit comprising a plurality of data storage devices, the data storage circuit coupled to the memory device for receiving and storing the streams of serial data bits from the memory device thereby allowing the output port to accommodate multiple sub-functions of a data frame;
   a combiner in communication with the data storage circuit, the combiner adapted to receive as input data bits of the streams of serial data bits stored in the data storage circuit, the combiner further adapted to generate data load patterns from the streams of serial data bits representing sub-functions of a data frame; and
   a transmitter circuit in communication with the combiner and coupled to the serial communications connection, the transmitter circuit receiving the data load patterns from the combiner and serially outputting selected data bits of each data load pattern responsive to an enable signal thereby forming a data frame, wherein the enable signal carries binary bits of a bit mask;
   wherein the transmitter circuit comprising:
     a transmit holding register coupled to the processor for downloading data load patterns;
     a transmit shift register coupled to the transmit holding register for downloading data load patterns from the transmit holding register in response to a control signal and serially outputting in response to a shift clock signal the data bits of each data load pattern received;
     a transmit mask hold register coupled to the processor for downloading the bit mask composed of binary bits from the processor;
     a transmit mask shift register coupled to the transmit mask hold register for downloading the bit mask in response to the control signal and serially outputting in response to the shift clock signal the enable signal having the same binary values as that of the bit mask bits; and
     an output buffer coupled to the transmit shift register and the transmit mask shift register for receiving as input the data bits serially output from the transmit shift register and the enable signal from the transmit mask shift register.

9. The output port of claim 8, wherein the combiner comprising instruction codes stored in the program memory, the instruction codes when executed by the processor cause the streams of serial data bits to be combined to form data load patterns.

10. The output port of claim 8, wherein each of the data storage devices storing a stream of serial data bits.

11. The output port of claim 8, wherein the transmitter circuit further comprising a clock divider receiving a clock signal from the serial communications connection, the clock divider adjusting the clock signal from the serial communications connection and supplying the adjusted signal to the transmit shift register and the transmit mask shift register for use as the shift clock signal.

12. The output port of claim 8, wherein the control signal being derived from a data frame start signal.

13. The output of claim 8 further comprising an data transfer circuit coupled to the processor, the memory device, and the data storage circuit for selecting and transferring one stream of serial data bits associated with a sub-function from the memory device to the data storage circuit at a time.

14. The output port of claim 8, wherein the output buffer outputting a data signal having the same binary values as that of the data bits in the transmit shift register when the enable signal has a first value and outputting a high impedance signal when the enable signal has a second value.

15. An i/o port coupled to a memory device, a program memory, a processor, and a serial communications connection transferring data frames comprising a plurality of sub-functions each composed of a plurality of data bits to and from the communications connection, the i/o port comprising:
   a receiver coupled to the serial communications connection for receiving data frames from the serial communications connection;
   a separator in communication with the receiver for receiving as input data frames from the receiver and separating the sub-functions of the data frames into corresponding streams of serial data bits;
   a data storage circuit comprising a plurality of data storage devices, the data storage circuit in communication with the separator for concurrently receiving the streams of serial data bits from the separator, the data storage coupled to the memory devices for receiving the streams of serial data bits from the memory device, the i/o port thereby accommodating multiple data frame sub-functions concurrently;
   a combiner in communication with the data storage circuit for receiving as input data bits of the streams of serial data bits stored in the data storage circuit and generating data load patterns from the streams of serial data bits; and
   a transmitter in communication with the combiner and coupled to the serial communications connection for receiving the data load patterns from the combiner and serially outputting selected data bits of each data load pattern responsive to an enable signal thereby forming a data frame, wherein the enable signal carries binary bits of a bit mask.

16. The i/o port of claim 15, wherein the receiver comprising:
   a receive shift register connected to the serial communications connection for serially receiving in response to a shift clock signal and storing data frame bits from the serial communications connection; and
   a receive holding register coupled to the receive shift register for downloading the data frame bits stored in the receive shift register in response to a data frame start signal, the receive holding register supplying the data frame bits to the data storage circuit.

17. The i/o port of claim 15, wherein the transmitter comprising:
a transmit holding register coupled to the processor for downloading data load patterns;
a transmit shift register coupled to the transmit holding register for downloading data load patterns from the transmit holding register in response to a data frame start signal and serially outputting, in response to the shift clock signal, the data bits of each data load pattern received;
a transmit mask hold register coupled to the processor for downloading a bit mask composed of binary bits from the processor;
a transmit mask shift register coupled to the transmit mask hold register for downloading the bit mask in response to the data frame start signal and serially outputting in response to the shift clock signal an enable signal having the same binary values as that of the bit mask bits; and
an output buffer coupled to the transmit shift register and the transmit mask shift register for receiving as input the data bits serially output from the transmit shift register and the enable signal from the transmit mask shift register, the output buffer outputting a data signal having the same binary values as that of the data bits in the transmit shift register when the enable shift signal has a first value.

18. The i/o port of claim 15, wherein the separator comprising instruction codes stored in the program memory that when executed by the processor separate the sub-functions of the data frames into corresponding streams of serial data bits.

19. The i/o port of claim 15, wherein the combiner comprising instruction codes stored in the program memory that when executed by the processor combine the streams of serial data bits to form data load patterns.

20. The i/o port of claim 16 further comprising an i/o data transfer circuit coupled to the processor, the memory device, and the data storage circuit, the i/o data transfer circuit selecting and transferring one stream of serial data bits associated with a sub-function to the memory device from the data storage circuit at a time, the data transfer circuit selecting and retrieving one stream of serial data bits associated with a sub-function from the memory device at a time.

21. A serial i/o controller coupled to a plurality of communications connections and a memory device comprising:
an internal bus;
a program memory coupled to the internal bus;
a processor coupled to the internal bus; and
a plurality of i/o ports coupled to the internal bus and the plurality of communications connections, the i/o ports transferring data frames comprising a plurality of sub-functions each composed of a plurality of data bits to and from the communications connections, each of the i/o port comprising:
a receiver coupled to the serial communications connection for receiving data frames from the serial communications connection;
a separator in communication with the receiver for receiving as input data frames from the receiver and separating the sub-functions of the data frames into corresponding streams of serial data bits;
a data storage circuit comprising a plurality of data storage devices, the data storage circuit in commu-nication with the separator for concurrently receiving the streams of serial data bits representing data frame sub-functions from the separator, the data storage circuit coupled to the memory device for receiving the streams of serial data bits representing data frame sub-functions from the memory device, each i/o port thereby capable of accommodating multiple data frame sub-functions concurrently;
a combiner in communication with the data storage for receiving as input data bits of the streams of serial data bits stored in the data storage and generating data load patterns from the streams of serial data bits; and
a transmitter in communication with the combiner and coupled to the serial communications connection for receiving the data load patterns from the combiner and serially outputting selected data bits of each data load pattern responsive to an enable signal thereby forming a data frame, wherein the enable signal carries binary bits of a bit mask.

22. A remote access server coupled to a network, the remote access server comprising:
a bus;
a host CPU coupled to the bus;
a memory device coupled to the bus;
a modem bank coupled to the network, the modem bank having a plurality of communications connections; and
a serial i/o controller coupled to the bus and the plurality of communications connections, the serial i/o controller comprising:
an internal bus;
a program memory coupled to the internal bus;
a processor coupled to the internal bus; and
a plurality of i/o ports coupled to the internal bus and the plurality of communications connections, the i/o ports transferring data frames comprising a plurality of sub-functions each composed of a plurality of data bits to and from the communications connections, each of the i/o port comprising:
a receiver coupled to one of the plurality of communications connections for downloading data frames from the communications connections, the receiver separating the sub-functions of the data frames into corresponding streams of serial data bits;
a data storage circuit comprising a plurality of data storage devices, the data storage circuit coupled to the receive, the processor, and the memory device, the data storage circuit selectively and concurrently receiving the streams of serial data bits from the receiver in the data storage devices, the data storage circuit receiving the streams of serial data bits from the memory device, the processor selecting the corresponding data bits of the streams of serial data bits from the memory device stored in the data storage means and forming data load patterns, each i/o port thereby capable of accommodating multiple data frame sub-functions concurrently; and
a transmitter coupled to the processor and the communications connections for receiving the data load patterns from the processor and serially outputting selected data bits of each data load pattern responsive to an enable signal thereby forming a data frame, wherein the enable signal carries binary bits of a bit mask.

23. A method for separating corresponding sub-functions from serial data frames composing of binary bits categorized as sub-functions into individual data streams to be transmitted one at a time:
- a) serially shifting the binary bits of a data frame into a shift storage element;
- b) concurrently loading the binary bits stored in the shift storage element into a holding storage element;
- c) transferring binary bits associated with a sub-function from the holding storage element to a FIFO in a block of multiple FIFOs;
- d) repeating step (c) such that different sub-functions in the data frame are concurrently received in different FIFOs in the block of multiple FIFOs; and
- e) repeating steps (a) to (d) so that corresponding sub-functions of succeeding data frames are received sequentially in the same FIFO.

24. A method for combining multiple data streams, wherein each data stream having binary bits associated with a different sub-function, into serial data frames wherein each data frame composing of binary bits categorized as sub-functions:
- a) forming a data load pattern by selecting binary bits associated with a sub-function from each data stream and arranging the binary bits in a pre-selected order;
- b) loading the binary bits of the data load pattern into a holding storage element;
- c) loading the binary bits of a bit mask into a mask holding storage element;
- d) loading the binary bits of the data load pattern stored in the holding storage element into a shift storage element;
- e) loading the binary bits of the bit mask stored in the mask holding storage element into a mask shift storage element such that steps (d) and (e) occur simultaneously together;
- f) serially shifting the binary bits of the data load pattern to an output buffer;
- g) serially shifting the binary bits of the bit mask stored in the mask shift storage element to the output buffer as an enable signal; and
- h) repeating steps (a) to (g) until the binary bits of all the data streams are combined into serial data streams.

* * * * *